(12) United States Patent
Morozini de Lira

(10) Patent No.: US 9,889,815 B2
(45) Date of Patent: Feb. 13, 2018

(54) PROTECTIVE DEVICE FOR OCCUPANTS OF A MOTOR VEHICLE IN THE CASE OF A SIDE IMPACT

(71) Applicant: Dr. Ing. h.c. F. Porsche Aktiengesellschaft, Stuttgart (DE)

(72) Inventor: Adriano Morozini de Lira, Stuttgart-Vaihingen (DE)

(73) Assignee: DR. ING. H.C.F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 15/132,672

(22) Filed: Apr. 19, 2016

(65) Prior Publication Data

US 2016/0325707 A1    Nov. 10, 2016

(30) Foreign Application Priority Data

May 5, 2015    (DE) ........................ 10 2015 106 987

(51) Int. Cl.

| | |
|---|---|
| *B60R 21/207* | (2006.01) |
| *B60R 21/231* | (2011.01) |
| *B60R 21/201* | (2011.01) |
| *B60R 21/00* | (2006.01) |
| *B60R 21/2338* | (2011.01) |

(52) U.S. Cl.
CPC ...... *B60R 21/23138* (2013.01); *B60R 21/201* (2013.01); *B60R 21/207* (2013.01); *B60R 2021/0039* (2013.01); *B60R 2021/23146* (2013.01); *B60R 2021/23386* (2013.01)

(58) Field of Classification Search
CPC ........... B60R 21/23138; B60R 21/201; B60R 21/207; B60R 2021/0039; B60R 2021/23386; B60R 2021/23146
See application file for complete search history.

(56) References Cited

U.S. PATENT DOCUMENTS

| | | | |
|---|---|---|---|
| 5,464,246 A | 11/1995 | Castro et al. | |
| 5,630,616 A * | 5/1997 | McPherson | B60R 21/207 |
| | | | 280/728.2 |
| 5,806,923 A | 9/1998 | Tschaeschke et al. | |
| 5,829,827 A | 11/1998 | Schaper et al. | |
| 6,029,993 A * | 2/2000 | Mueller | B60R 21/23138 |
| | | | 280/730.2 |

(Continued)

FOREIGN PATENT DOCUMENTS

| | | |
|---|---|---|
| DE | 44 36 139 | 3/1996 |
| DE | 196 28 108 | 6/1997 |

(Continued)

OTHER PUBLICATIONS

German Search Report dated Oct. 20, 2015.

*Primary Examiner* — Drew J Brown
(74) *Attorney, Agent, or Firm* — Gerald E. Hespos; Michael J. Porco; Matthew T. Hespos

(57) ABSTRACT

A protective device is provided to reduce an occurrence of injury in the case of a far-side side impact of a vehicle. The protective device has an airbag attached to a side of a seat closer to the center of the vehicle. The air bag has a first airbag element attached to the seat back to extend in the region of the thorax and a second airbag element attached to the seat frame to protect the pelvis in the case of the far side impact.

6 Claims, 5 Drawing Sheets

(56) References Cited

U.S. PATENT DOCUMENTS

| | | | |
|---|---|---|---|
| 7,021,654 B2 * | 4/2006 | Honda | B60R 21/207 |
| | | | 280/730.2 |
| 7,021,655 B2 | 4/2006 | Saiguchi et al. | |
| 7,048,300 B2 | 5/2006 | Honda et al. | |
| 7,198,288 B2 * | 4/2007 | Kim | B60R 21/207 |
| | | | 280/730.2 |
| 8,176,863 B2 * | 5/2012 | Evans | B60N 2/58 |
| | | | 112/475.08 |
| 8,899,619 B2 * | 12/2014 | Fukawatase | B60R 21/207 |
| | | | 280/730.2 |
| 9,039,035 B1 * | 5/2015 | Faruque | B60R 21/207 |
| | | | 280/728.2 |
| 2008/0238052 A1 | 10/2008 | Iida et al. | |
| 2015/0115576 A1 | 4/2015 | Acker et al. | |
| 2015/0191143 A1 * | 7/2015 | Faruque | B60R 21/261 |
| | | | 280/730.2 |

FOREIGN PATENT DOCUMENTS

| | | |
|---|---|---|
| DE | 197 38 728 | 3/1999 |
| DE | 198 45 992 | 5/1999 |
| DE | 102 58 245 | 6/2004 |
| DE | 10 2008 016 162 | 10/2008 |
| DE | 10 2012 008 391 | 10/2013 |
| EP | 0 688 702 | 12/1995 |

* cited by examiner

PROTECTIVE DEVICE FOR OCCUPANTS OF A MOTOR VEHICLE IN THE CASE OF A SIDE IMPACT

CROSS REFERENCE TO RELATED APPLICATION

This application claims priority under 35 USC 119 to German Patent Appl. No. 10 2015 106 987.3 filed on May 5, 2015, the entire disclosure of which is incorporated herein by reference.

BACKGROUND

1. Field of the Invention

The invention relates to a protective device for occupants of a motor vehicle in the case of a side impact.

2. Description of the Related Art

DE 10 2012 008 391 A1 discloses an occupant protective system for a motor vehicle having an airbag that can be filled via a gas generator. The air bag is folded and received in a backrest of the vehicle seat. However, the air bag that has been unfolded by the gas extends between two seats.

It is an object of the invention to provide a protective device for occupants of a motor vehicle in the case of a side impact that is known as a "far-side impact", and more particularly to provide a protective device that is arranged on an inner side of a front seat and ensures a movement of the occupant by holding the occupant in the seat.

SUMMARY

The protective device of the invention avoids injuries in the case of a far-side impact or in the case of a side impact by holding the occupant in his/her seat or keeping the movement of the occupant to a minimum. This is achieved in an advantageous way by arranging the airbag within the seat structure in a folded basic position. The protective device comprises first and second airbag elements that are arranged respectively in the side part of the backrest and, in an extension, in the side part of the seat frame. The first airbag element is held in the backrest at a position to cover a thorax and head region in the unfolded protective position. The second airbag element is held in the seat frame covering substantially a pelvis and leg region. The protective device make it possible that the occupant will experience no undesired contact with the interior of the vehicle, or minimal contact, such as contact with the center console, with the opposite door and B-pillar or even with other occupants, for example.

The peculiarity of a "far-side impact" is reflected by way an injury occurs. A "near-side impact" typically has injuries caused by the penetrating element. However, the occupant is not likely to have contact with a penetrating object in the case of a "far-side impact". Rather, the occupant is injured by contact with interior components of the vehicle, against which he/she is pushed by the pronounced acceleration.

The invention avoid injuries to the occupant because the two unfolded airbag elements have a curved shape adapted to the body of the occupant, and because a spread sail is connected to the airbag and the seat to fill a clearance between the airbag elements and the front seat. Thus, the free region between the seat and the airbag is covered by the spread sail and the occupant cannot slip through.

The airbag may be fastened via attachment points laterally to the backrest and the seat by elastic straps, and the airbag elements are configured to be elastic in a backrest pivot axis between the attachment points. This elastic transition from the seat cushion to the backrest enables an adjustment of the seat into various positions possible and to ensure the function of the airbag modules in different seat positions.

The airbag is folded or rolled and then inserted into a protective cover. This unit then can installed simply and easily into the seat frame. Furthermore, the folded or rolled airbag is enclosed by releasable straps that permit unimpeded unfolding of the folded airbag.

The first airbag element may be fastened to a first attachment point below a seat cushion and may be connected further on the side part of the backrest via a second articulation point. The airbag elements may be elastic in the transition region, and plastic panels may be provided on the inner side of the front seat for further fastening of the airbag. Seat upholstery can be mounted after the airbag module is fastened to the seat frame or in the seat structure so that the airbag module is below the seat upholstery.

The airbag that is in the unfolded protective position on the inner side of the front seat forms a connection between the seat subframe or the seat structure and the backrest so that the unfolded airbag holds the seated person in his/her seated position in the case of a far-side impact and keep him/her spaced apart from contact with interior components. The fixed holding of the occupant in the seat is important during a far-side impact because, absent the invention, the body of the occupant moves inward as a result of the side impact and slides out of the belt system so that the upper body no longer remains fastened in the seat. An additional holding protection for the occupant is achieved by the spread sail.

One exemplary embodiment of the invention is shown in the drawings and will be described in greater detail in the following text.

DETAILED DESCRIPTION

Figure 1:
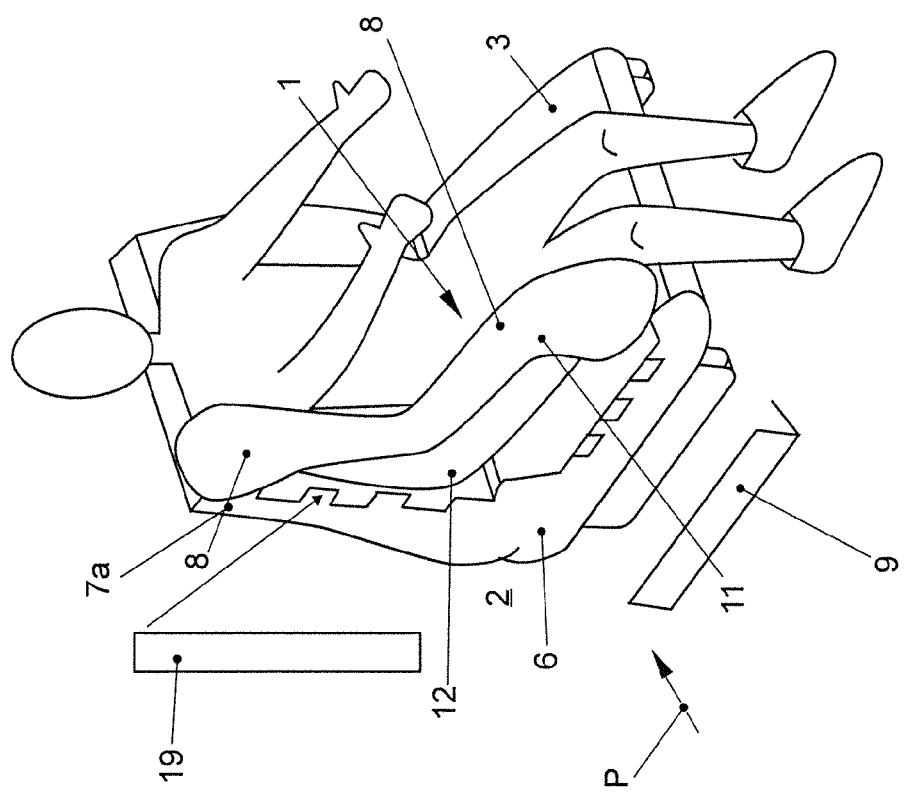
FIG. 1 shows a front seat with an inflated airbag in a protective position.
Figure 2:
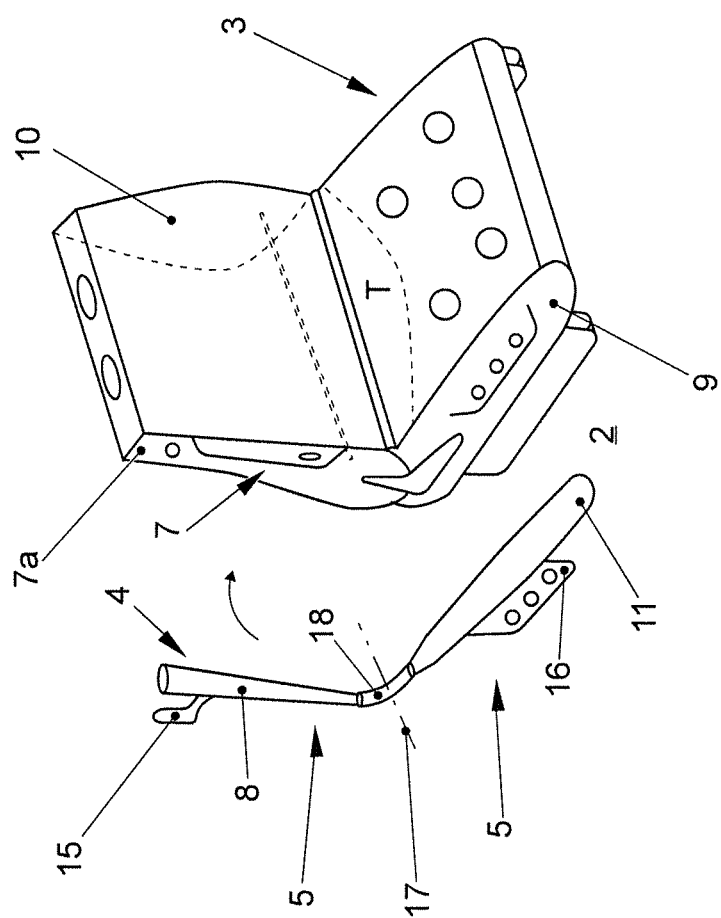
FIG. 2 shows the front seat in a pre-mounting position of the airbag into the seat structure.

A protective device 1 is provided for occupants of a motor vehicle in the case of a far-side impact in the arrow direction P is fastened to an inner side 2 of a front seat 3. The device 1 has an airbag element 5 that can be inflated by a generator 4 and has a tubular textile structure. The airbag element 5 is integrated into the front seat 3 in a folded basic position I and is positioned on the inner side directly next to the front seat 3 in an unfolded protective position II, in which it is filled with air.

The occupant is on the side of the impact in the case of a near-side side impact of a vehicle. However, the occupant is seated on the opposite side of the impact in the case of a far-side side impact. The folded airbag 5 is arranged within the seat structure 6 in the basic position I and comprises a first airbag element 8 that is held in the side part 7 of the backrest 7a. A second airbag element 11 extends from an end of the airbag element 8 and is situated in the side part 9 of the seat frame 10. The airbag elements 8, 11 can be filled at the same time and are connected to one another in terms of effect.

In the unfolded protective position II of the airbag 5, the first airbag element 8 covers a thorax and head region, and the second airbag element 11 covers a pelvis and leg region as far as possible.

Figure 4:
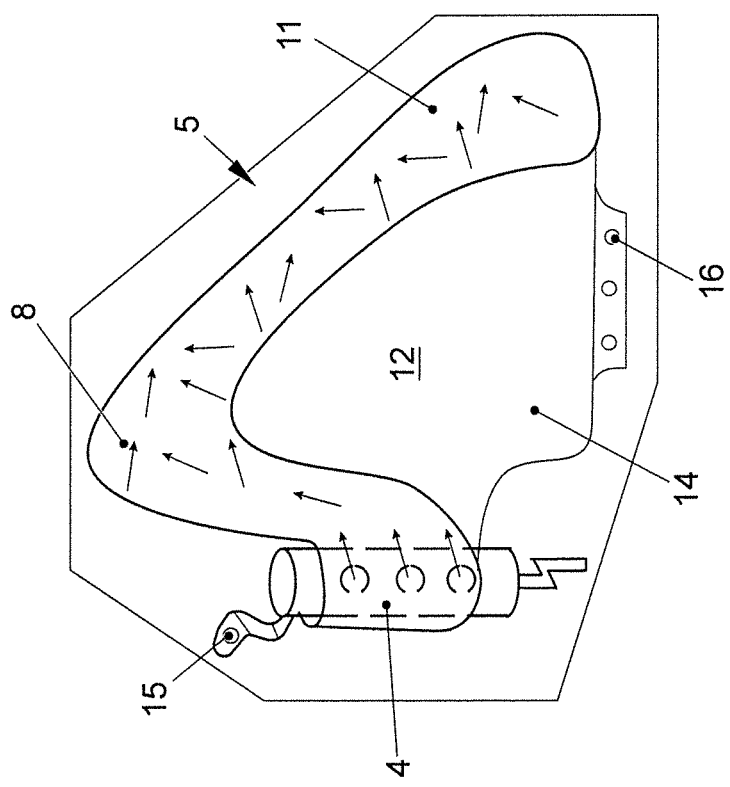
FIG. 4 shows the inflated airbag in the protective position with a sail arranged in a spread manner at attachment points.

The two airbag elements 8 and 11 define a tubular textile structure and, in the unfolded protective position II, have a curved shape that is adapted to the body of the occupant in an approximately perpendicular plane. A spread sail 14 is connected to the airbag 5 and the seat 3 and is arranged in a clearance 12 between the two unfolded airbag elements 8, 11 and the front seat 3. The sail 14 is a flatly extending sheet or the like in the manner of a sail used in a boat. The shape of the unfolded airbag 5 can have a curved S-shape (FIG. 1) or a shape (FIG. 4) that is bent in an angular manner. In every case, the shape is adapted to the body profile in the seat.

The airbag 5 is fastened via attachment points 15, 16 first laterally to the backrest 7a and second to the seat frame 10 by elastic straps. The airbag elements 8, 11 and the airbag 5 are configured as an elastic region 18 in a backrest pivot axis 17 between the attachment points 15, 16 so that an adjustment of the seat or the backrest 7a is not impeded.

Figure 5A:
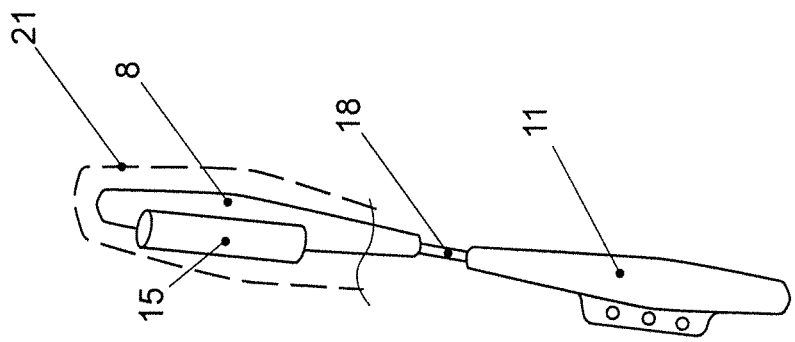
FIG. 5a shows the rolled-up airbag with straps wound around it.
Figure 5:
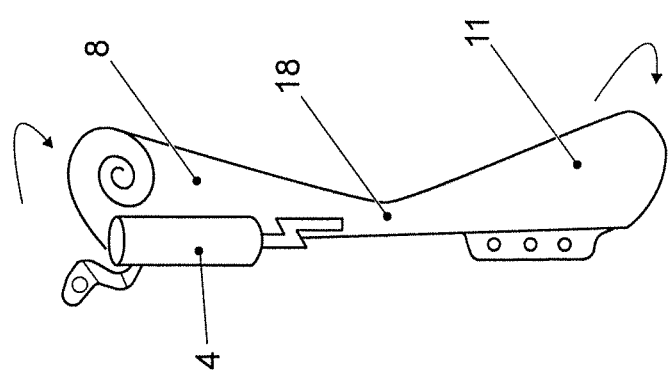
FIG. 5 shows the airbag in the rolled-up state.

As shown in greater detail in FIGS. 5 and 5a, the airbag 5 is rolled or folded in the basic position I and is inserted into a protective cover 21 and can subsequently be mounted correspondingly into the seat structure 16. The folded or rolled airbag 3 is enclosed by detachable straps that are intended to prevent unimpeded unfolding of the airbag 5.

Figure 3:
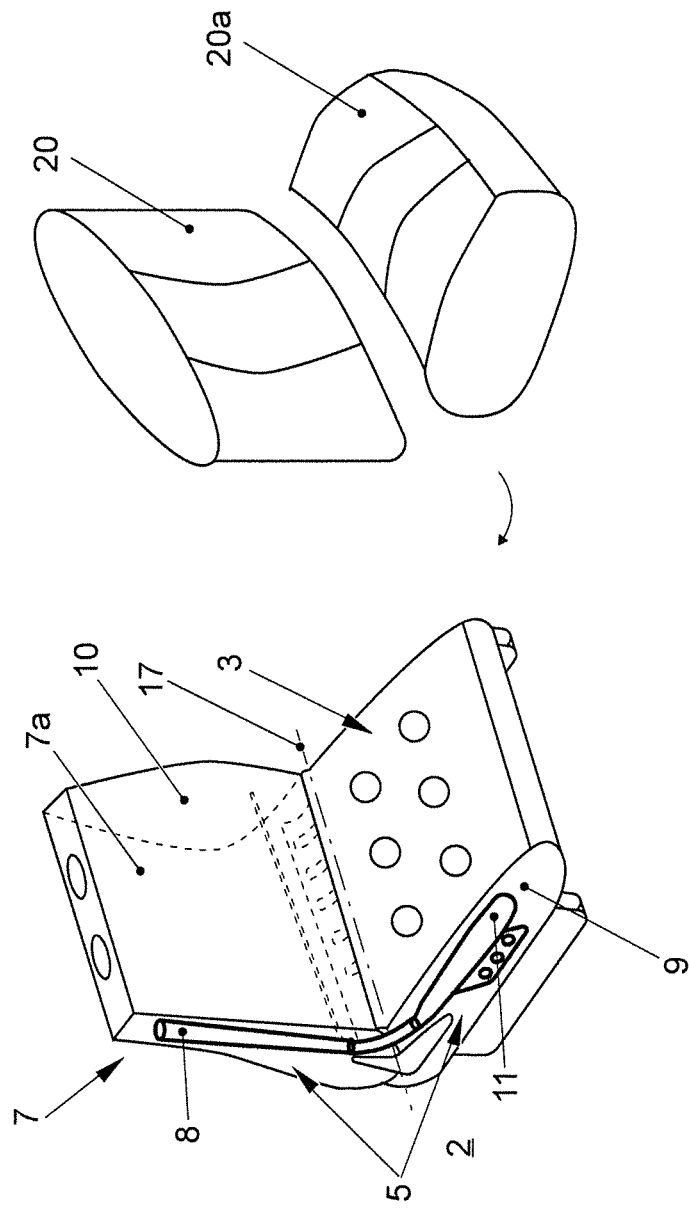
FIG. 3 shows the front seat with an installed airbag and seat cushions that can be mounted thereon.

After mounting of the airbag 5 in the seat 3, the airbag 5 is arranged with the airbag elements 8, 11 below upholstery 20, 20a of the backrest 7a and the seat 6, as shown in FIG. 3. Plastic panels 19 are fastened to the side of the seat 3 for further fastening of the airbag 5.

What is claimed is:

1. A protective device for occupants of a motor vehicle in the case of a side impact, the protective device being fastened to a side of a front seat closer to a center of the vehicle and comprising: an airbag that can be inflated by a gas generator, the airbag being integrated into the seat in a folded basic position and being positioned next to the front seat in an unfolded protective position that is filled with air, the airbag including a first airbag element arranged in the side part of a backrest in the folded basic position and a second air bag element extending from an end of the first air bag element and being arranged in a side part of a pelvic support of the front seat in the folded basic position, the first airbag element being configured for covering a thorax and head region in the unfolded protective position, and the second airbag element being configured for covering a pelvis and leg region in the unfolded protective position, the first and second airbag elements defining a tubular textile structure and, in the unfolded protective position, have a curved body-contoured shape with an upper end secured to an upper position on the backrest and a lower end adjacent the pelvic support at a position forward of the backrest, areas of the tubular textile structure between the ends being spaced forward of the backrest and above the pelvic support in the unfolded protective position, the protective device further comprising a spread sail connected to the airbag and to the seat and filling a clearance between the airbag elements and both the pelvic support and the backrest of the front seat as the airbag is inflated.

2. The protective device of claim 1, wherein the first and second airbag elements are fastened via first and second attachment points laterally to the backrest and the seat frame, and the airbag elements are configured to be elastic in a backrest pivot axis between the attachment points.

3. The protective device of claim 1, wherein, in the basic position, the airbag is folded or rolled and is disposed in a protective cover that is mounted into the seat frame.

4. The protective device of claim 1, further comprising detachable straps that enclose the folded or rolled airbag that permit unimpeded unfolding of the folded airbag.

5. The protective device of claim 1, wherein the first airbag element is fastened on the side part of the backrest at a first attachment point below a first seat cushion, and the second airbag element is connected to the seat frame at a second attachment point below a second seat cushion, the airbag being elastic in a transition region between the first and second airbag elements, and plastic panels are fastened to the inner side of the front seat for further fastening of the airbag.

6. The protective device of claim 1, wherein the airbag in the unfolded protective position extends between the seat subframe or the seat structure and the backrest on the inner side of the front seat so that the unfolded airbag keeps the seated person in a seated position and spaced apart from contact with components near the seat in the case of a side impact.

* * * * *